(12) United States Patent
Kim

(10) Patent No.: US 6,384,864 B1
(45) Date of Patent: May 7, 2002

(54) LETTER-BOX FILTERING CIRCUIT AND METHOD USING THE SAME

(75) Inventor: Young-No Kim, Seoul (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/121,864

(22) Filed: Jul. 24, 1998

(30) Foreign Application Priority Data

Jul. 29, 1997 (KR) .............................. 97-35707

(51) Int. Cl.[7] .............................. H04N 7/01; H04N 9/64; G06F 17/10; G06K 9/38
(52) U.S. Cl. .................. 348/441; 348/443; 348/445; 348/571; 348/607; 348/913; 382/272; 382/260; 382/261; 382/262; 382/263; 382/265; 708/300; 708/301; 708/302
(58) Field of Search ................ 348/441, 571, 348/607, 445, 913, 443; 382/272, 260, 261, 262, 263, 264, 265; 712/300, 223, 224; 708/209, 300–323, 620–633, 523

(56) References Cited

U.S. PATENT DOCUMENTS

| | | | | |
|---|---|---|---|---|
| 4,817,180 A | * | 3/1989 | Cho et al. ...................... | 382/54 |
| 4,885,787 A | * | 12/1989 | Okamoto et al. .............. | 382/54 |
| 4,953,118 A | * | 8/1990 | Gockler ..................... | 364/724.1 |
| 5,218,563 A | | 6/1993 | Juri et al. ..................... | 364/745 |
| 5,313,281 A | | 5/1994 | Richards ........................ | 348/443 |
| 5,351,312 A | * | 9/1994 | Sato et al. ..................... | 382/50 |
| 5,649,031 A | * | 7/1997 | Nakamura et al. ........... | 382/254 |
| 5,666,299 A | * | 9/1997 | Adams et al. ......... | 364/724.011 |
| 5,742,349 A | * | 4/1998 | Choi et al. ................... | 348/443 |
| 5,805,229 A | * | 9/1998 | Song .......................... | 348/424 |
| 5,856,850 A | * | 1/1999 | Miyazaki ..................... | 348/441 |
| 5,946,454 A | * | 8/1999 | Shu et al. ..................... | 395/109 |
| 5,983,253 A | * | 11/1999 | Fischer et al. .............. | 708/300 |
| 6,009,451 A | * | 12/1999 | Burns .......................... | 708/525 |
| 6,175,592 B1 | * | 1/2001 | Kim et al. ................... | 375/240 |

FOREIGN PATENT DOCUMENTS

JP 06-203592 7/1994

\* cited by examiner

Primary Examiner—John W. Miller
Assistant Examiner—Paulos Natnael
(74) Attorney, Agent, or Firm—Fleshner & Kim, LLP

(57) ABSTRACT

A letter-box filtering circuit and a method of using the same that includes a preprocessing filter circuit and a filtering circuit to reduce or correct the round-off errors generated when displaying an image of 16:9 on a screen of 4:3 in a digital image processing. The letter-box filtering circuit can display the down sampled image based on the 16:9 image without any distortion or reduced distortion.

23 Claims, 4 Drawing Sheets

LETTER-BOX FILTERING CIRCUIT AND METHOD USING THE SAME

BACKGROUND OF THE INVENTION

1. Field of the Invention

The present invention relates to a filtering circuit for displaying an image, and in particular, to a letter-box filtering circuit and a method using the same for sampling an image.

2. Background of the Related Art

A filter coefficient used for a letter-box filtering circuit is experimentally determined. To easily structure the letter-box filtering circuit hardware, filter coefficients such as 0.25, 0.5, 0.75, etc. are used as shown in FIG. 1. When the filter coefficient 0.5 is multiplied by a pixel value (e.g., pixel value A), the pixel data is shifted to the right for 1 bit. Similarly, when the coefficient 0.25 is multiplied by the pixel value, the pixel data is shifted 2 bits to the right. When 0.75 is multiplied by the pixel value, the pixel data is obtained by adding the previous two resultant values. That is, 0.75A= 0.5A+0.25A. In FIG. 1, A, B, C, and D are pixels before filtering, and α, β, and γ are pixels after filtering.

When A is a pixel data of 8 bits in a related art letter-box filtering circuit, FIG. 2 is a diagram showing a circuit diagram for obtaining a value (e.g., 0.75A) in which the pixel A is multiplied by 0.75 of a filter coefficient. As shown in FIG. 2, an operand of 0.75 is made by adding an operand OP21 of 0.5A, which is obtained by shifting an inputted pixel data 1 bit to the right, and an operand OP22 of 0.25A, which is obtained by shifting the inputted pixel data 2 bits to the right.

In the case of 0.25 and 0.5, each one of the filtering data is obtained by right shifting the pixel data. In the case of 0.75, the filtering data is obtained by adding the two (e.g., 0.25 and 0.5) right shifted filtering data.

Down sampling data is obtained by adding two data that are lengthwise adjacent to each other.

TABLE 1

| round-off of 0.25A | |
|---|---|
| A[1:0] | an error |
| 0 0 | 0 |
| 0 1 | −0.25 |
| 1 0 | −0.5 |
| 1 1 | −0.75 |

TABLE 2

| round-off of 0.5A | |
|---|---|
| A[0] | an error |
| 0 | 0 |
| 1 | −0.5 |

TABLE 3

| round-off of 0.75A | |
|---|---|
| A[1:0] | an error |
| 0 0 | 0 |
| 0 1 | −0.75 |

TABLE 3-continued

| round-off of 0.75A | |
|---|---|
| A[1:0] | an error |
| 1 0 | −0.5 |
| 1 1 | −1.25 |

TABLE 4

| $A[1:0] = 00_2$ | |
|---|---|
| B[1:0] | an error of 0.75A + 0.25B |
| 0 0 | 0 |
| 0 1 | −0.25 |
| 1 0 | −0.5 |
| 1 1 | −0.75* |

TABLE 5

| $A[1:0] = 01_2$ | |
|---|---|
| B[1:0] | an error of 0.75A + 0.25B |
| 0 0 | −0.75 (+0.25) |
| 0 1 | −1.0 (0) |
| 1 0 | −1.25 (−0.25) |
| 0 0 | −1.5 (−0.5)* |

TABLE 6

| $A[1:0] = 10_2$ | |
|---|---|
| B[1:0] | an error of 0.75A + 0.25B |
| 0 0 | 0 |
| 0 1 | −0.75* |
| 1 0 | −0.5* |
| 1 1 | −1.25* |

TABLE 7

| $A[1:0] = 11_2$ | |
|---|---|
| B[1:0] | an error of 0.75A + 0.25B |
| 0 0 | −1.25 (−0.25) |
| 0 1 | −1.5 (−0.5) |
| 1 0 | −1.75 (−0.75)* |
| 1 1 | −2.0 (−1.0)* |

Tables 1–7, A and B are two pixel data that are lengthwise adjacent to each other. Also, a value illustrated in brackets ( ) shows an error when a value 0.75A is erroneously corrected. A value designated by an "*" shows a case where correction by rounding is also required.

TABLE 8

| $B[0] = 0_2$ | |
|---|---|
| C[0] | an error of 0.5B + 0.5C |
| 0 | 0 |
| 1 | 0.5 |

TABLE 9

| | B[0] = 1, | |
|---|---|
| C[0] | an error of 0.5B + 0.5C |
| 0 | −0.5 |
| 1 | −1* |

In Tables 8–9, B[O] and C[O] are the lowest bits of the two pixel data that are lengthwise adjacent to each other. Also, a value designated by an "*" in Table 9 shows a case where correction by rounding is also required.

A shifting operation to the right in order to multiply 0.5 or 0.25 to a pixel data value deletes 1 bit or 2 bits of the lowest bits (i.e., the least significant bits (LSB)). Accordingly, when a value, of the deleted bit is 1, a value 0.75 that is multiplied by the pixel data value may have an error up to 1.25 Refer to Tables 1, 2, and 3).

Since an error occurred by the shifting operation is accumulated in the addition for filtering, an error up to 2 may be generated in an operation of 0.75A+0.25B (refer to Tables 4–7 and FIG. 3). Also, an error can be produced up to 1 in an operation of 0.5B+0.5C (see Tables 8 and 9 and FIG. 4). An operation of 0.25C+0.75B is as same as the result of 0.75A+0.25B. Again, the A, B, C, and D data is assumed to be a pixel data of 8 bits that is lengthwise adjacent to each other.

SUMMARY OF THE INVENTION

An object of the present invention is to provide a filtering circuit and method that US=: substantially obviates at least one of the problems or limitations of the related art.

Another object of the present invention to provide a letter-box filtering circuit and a method using the same that corrects a round-off error that occurs in a process of la multiplying a prescribed filter coefficient such as 0.25, 0,5, or 0.75, etc.

Another object of the present invention is to provide a letter-box filtering circuit and a method using the same that corrects errors in a down sampling addition or the like.

Another object of the present invention is to provide a letter-box filtering circuit and a method using the same that minimizes round-off error.

Another object of the present invention is to provide a letter-box filtering circuit and a method using the same that uses an additional circuit to correct both round-off and down sampling addition errors.

Another object of the present invention is to provide a letter-box filtering circuit and a method using, the same that displays an image having, an aspect ratio of 16:9 on a display unit having an aspect ration of 4:3 in a digital screen process.

Another object of the present invention is to provide a filtering circuit and a method using the same that down samples an aspect of NTSC 720*480 to an aspect of 720*360 (in case of PAL, 720*576 to 720*432) and expects and corrects a round-off error that occurs in multiplying a prescribed filter coefficient by a pixel value and in a down sampling addition to minimize or reduce an overall round-off error.

To achieve at least the above objects in a whole or in parts, there is provided a letter-box filtering circuit, according to the present invention, that includes a preprocessing correcting circuit that combines first data deleted when a pixel data is right-shifted when multiplying a filter coefficient by the pixel data and selectively inputting a first resultant value to an adder, and a filtering correcting circuit that combines second data deleted when the pixel data is right-shifted in a filtering addition and selectively inputting a second resultant value to the adder.

To further achieve the above objects in a whole or in parts, there is provided a letter-box filtering method according to the present invention that includes a preprocessing correcting step for correcting a first error by combining data that are deleted when multiplying a filter coefficient by a pixel data for a down sampling, and a filtering correcting step for correcting a second error by combining data that are deleted when a filtering addition when correction is required.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
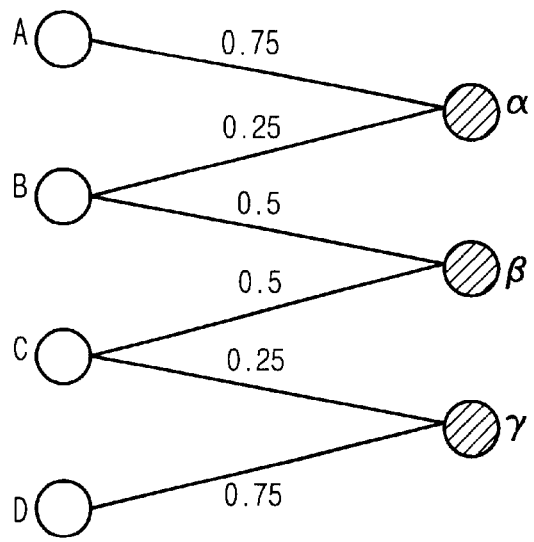
FIG. 1 is a diagram illustrating letter-box filtering.
Figure 2:
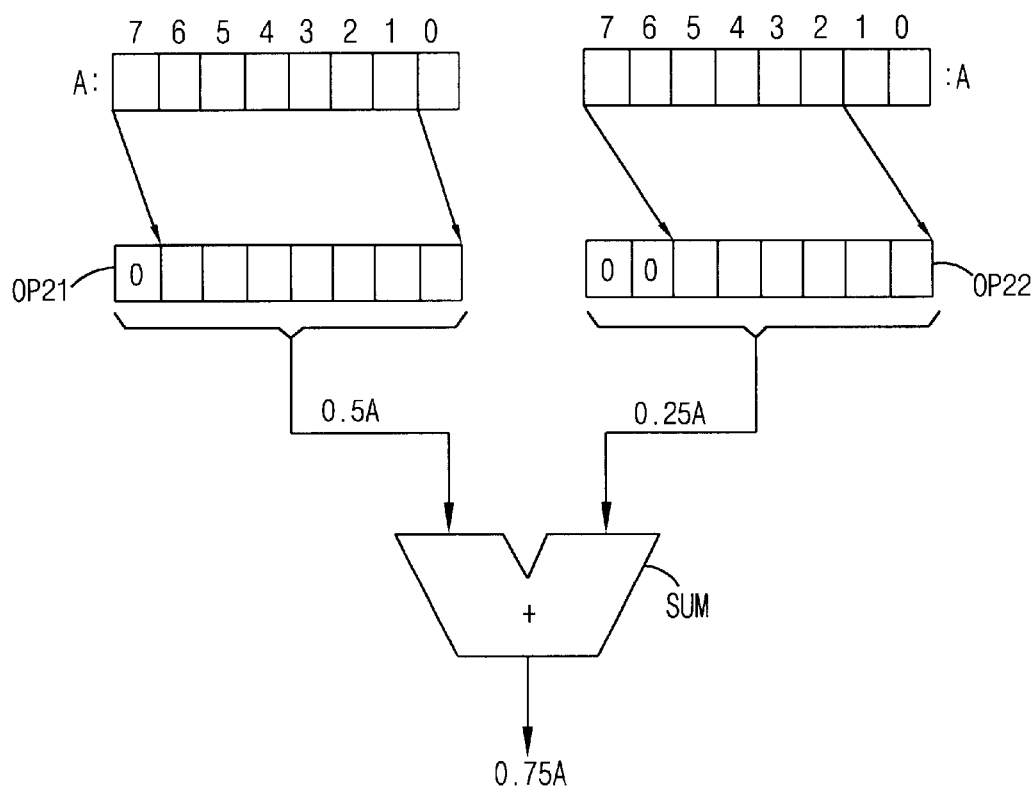
FIG. 2 is a diagram illustrating 0.75 of a filter coefficient being multiplied by a pixel data according to a related art.
Figure 3:
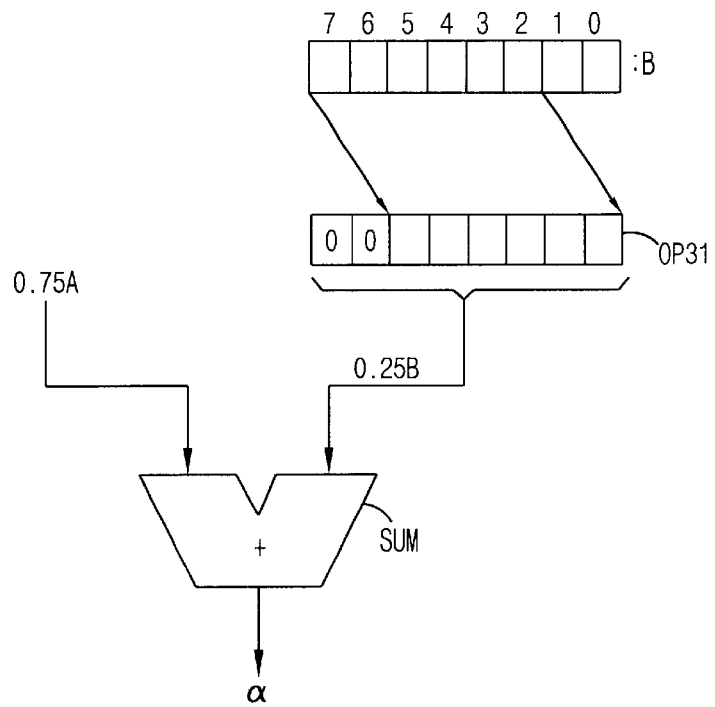
FIG. 3 is a diagram illustrating a related art letter-box filtering circuit for adding a first value where 0.75 of a filter coefficient is multiplied by a first pixel data to a second value where a second pixel data is multiplied by 0.25 of a filter coefficient.
Figure 4:
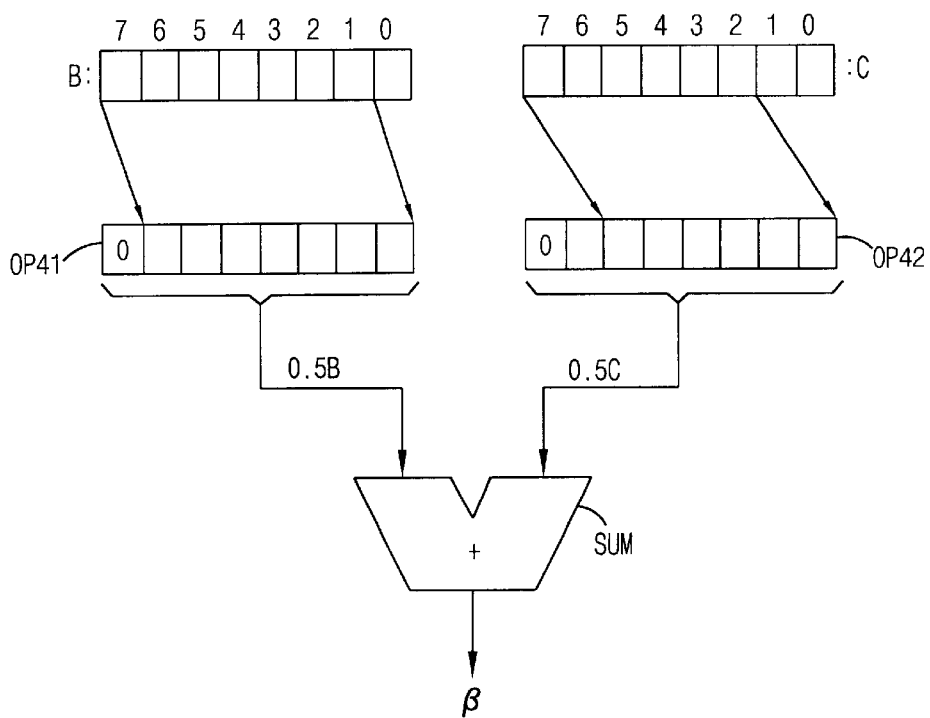
FIG. 4 is a diagram illustrating a related art letter-box filtering circuit that adds a value where 0.5 of a filter coefficient is multiplied by a first pixel data to another value where a second pixel data is multiplied by 0.5 of a filter coefficient.
Figure 5:
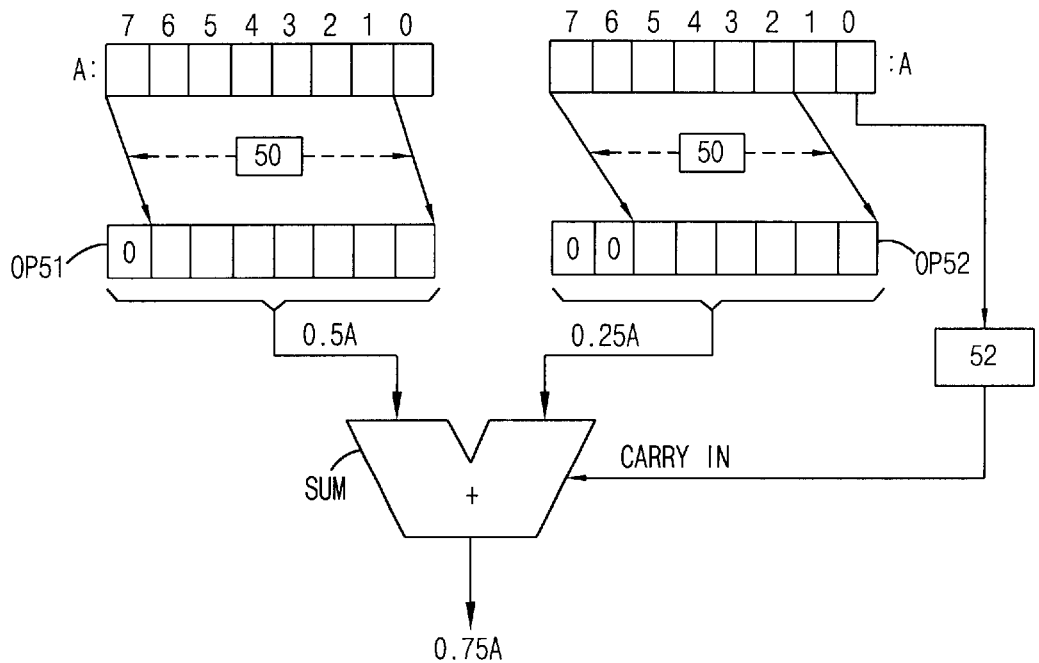
FIG. 5 is a diagram illustrating an exemplary preprocessing circuit of a preferred embodiment of a filter circuit according to the present invention where 0.75 of a filter coefficient is multiplied by a pixel data.

A filtering circuit according to a preferred embodiment of the present invention includes a preprocessing correcting circuit for obtaining an intermediate value, which is a prescribed filter coefficient multiplied by an input data value, and a filter correcting circuit for determining filtered data. The preprocessing correcting circuit can obtain, for example, an intermediate value such as 0.75A as shown in FIG. 5. The filter correcting circuit determines filtered data from, for example, two intermediate values determined by the preprocessing correcting circuit. Thus, the filtering circuit can obtain, for example, the filtered data a and P as shown in FIGS. 6–7.

As shown in FIG. 5, an exemplary preprocessing correcting circuit can output or combine with a combiner 52 a LSB A0 or the like, which is deleted when an input pixel data is shifted to the right, for example by a shifter or plurality of shifters 50 when multiplying a filter coefficient by the pixel data for performing a down sampling to generate a resultant value. The preprocessing correcting circuit preferably couples the resultant value (e.g., A0) to a carry-in terminal Carry In of an adder SUM.

Figure 6:
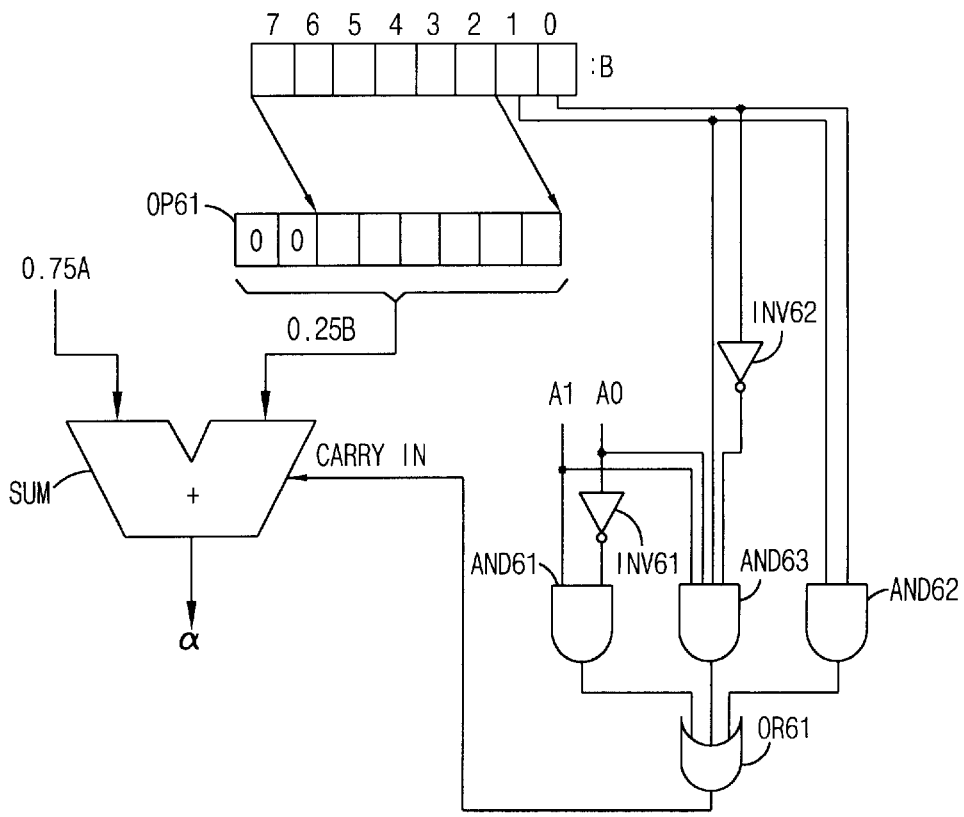
FIG. 6 is a diagram illustrating an exemplary first filtering circuit of a preferred embodiment of a filter circuit according to the present invention where an intermediate value where 0.75 of a filter coefficient is multiplied by a first pixel data is added to another value where a second pixel data is multiplied by 0.25 of a filter coefficient.
Figure 7:
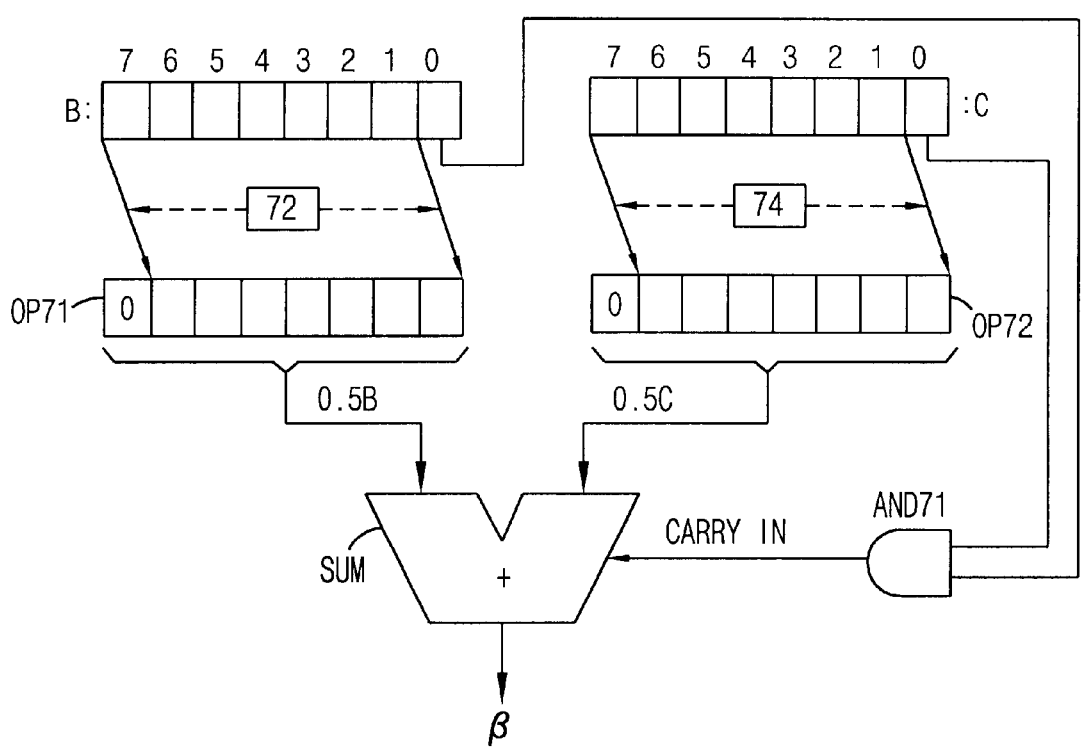
FIG. 7 is a diagram illustrating an exemplary second filtering circuit of a preferred embodiment according to the present invention that adds an intermediate value where 0.5 of a filter coefficient is multiplied by a first pixel data to another value where a second pixel data is multiplied by 0.5 of a filter coefficient.

An exemplary filtering correcting circuit according to the present invention includes a first filtering correcting circuit as shown in FIG. 6 for adding a value 0.75A, which results when a pixel data A is multiplied by 0.75 of a filter coefficient to a value 0.25B, which results when a pixel data B is multiplied by 0.25 of a filter coefficient and a second filtering correcting circuit, as shown in FIG. 7. The second filtering correcting circuit adds a value 0.5B, which results when a pixel data B is multiplied using shifter/multiplier or plurality of shifters 72 by 0.5 of a filter coefficient, to a value 0.5C, which results when a pixel data C is multiplied by 0.5 using shifter or a plurality of shifters 74 of a filter coefficient, as shown in FIG. 7.

The first filtering correcting circuit as shown in FIG. 6 includes an inverter INV61 for inverting the LSB A0 of the pixel data A and an AND gate AND61 for receiving the two LSBs A0 and A1 of the pixel data A. An AND gate AND62 receives two LSBs B0 and B1 of the pixel data B, which is adjacent to the pixel data A and is multiplied by 0.25 of the filter coefficient. An inverter INV62 receives the LSB B0 of the pixel data B and an AND gate AND63 receives the two LSBs A0 and A1 of the pixel data A, an output of the inverter INV62 and the second LSB B1 of the pixel data B. The first filtering circuit further includes an OR gate OR61 coupled to the carry-in terminal Carry In of the adder SUM. The OR gate OR61 receives outputs from the AND gates AND61, AND62, and AND63.

The second filtering correcting circuit as shown in FIG. 7 includes an AND gate AND71 coupled to the carry-in terminal Carry In of the adder SUM. The AND gate AND71 receives a LSB B0 of the pixel data B which is multiplied by 0.5 of the filter coefficient, and a LSB C0 of the pixel data C which is multiplied by 0.5 of the filter coefficient.

The preferred embodiment of a filtering method such as a letter-box filtering method according to the present invention will now be described. The preferred embodiment of a filter circuit described with reference to FIGS. 5–7 is an exemplary device that can perform the preferred embodiment of a filtering method.

As shown in FIG. 5, the preprocessing correcting circuit generates the value 0.5A, which has 0.5 of the filter coefficient obtained when the 8 bit pixel data A is shifted once to the right. The lowest bit A0 of the value 0.5A is deleted. The value 0.5A is formed as an operand OP51 having 0 as its highest bit.

The preprocessing correcting circuit further generates the value 0.25A, which has 0.25 of the filter coefficient, obtained when the 8 bit pixel data A is shifted twice to the right. The value 0.25A is formed as an operand OP52 having 0 as its highest and second highest bits (i.e., most significant bits (MSBs)).

The two data 0.5A, 0.25A, which are the operands OP51 and OP52, respectively, are added together by the adder SUM. As shown in FIG. 5, the lowest bit A0 previously deleted when obtaining the value 0.25A is then input to the carry-in terminal Carry In of the adder SUM to correct an error.

In particular, when adding the value 0.5A to the value 0.25A to obtain the value 0.75A, the preferred embodiment of a method determines whether an error occurs for a bit-pattern of A[1:0]. If an error is determined for correction, the correction is reflected to the adding operation. For example, when A[1:0]=$01_2$ (i.e., an error is −0.75), or A[1:0]=$11_2$ (i.e., an error is −1.25), each +1 is added to correct each error so that each corrected error becomes +0.25 and −0.25, respectively.

As shown in FIG. 6, the first filtering circuit correct errors as shown in Tables 4 to 7, generated when adding, the value 0.75A having, 0.75 of the filter coefficient to the value 0.25A having, 0.25 of the filter coefficient. In particular, when adding, the intermediate values, the lowest bits A0 and B0 and the second lowest bits A1 and B1, which are deleted from the pixel data A and B, are combined and carried to the adder SUM to correct the error.

As shown in FIG. 7, using the preferred embodiment of a method described above, errors shown in Tables 8 and 9, which are generated when adding, the value 0.5A having, 0.5 of the filter coefficient to the value 0.5B having 0.5 of the filter coefficient, can be corrected using the second filtering circuit. In particular, the lowest bits B0 and C0, which are deleted from the pixel data B and C, are combined together and a resultant value is inputted to the carrying terminal Carry In of the adder SUM to correct the error.

Accordingly, when two data 0P71 and 0P72 are added together, an error exceeding 0.5, which can be generated in the letter-box filtering process, is corrected to be less than 0.5. Thus, using, the preferred embodiments according to the present invention, the necessity of a correction (e.g., carry) is determined (e.g., looked ahead) and a resultant is reflected to the adding, operation to generate a result having an error under As described above, the preferred embodiments according to the present invention have various advantages. The preferred embodiments can reduce a round-off error generated in a filtering process such as a letter-box filtering process for down sampling and displaying an image of 16:9 on a screen of 4:3 in digital image processing or the like. In the process of multiplying the a filter coefficient by the pixel data, the preferred embodiments of a filtering circuit and method using the same according to the present invention corrects the error using a correction circuit. The correction circuit preferably compensates for filtering errors (e.g., round-off errors) to display the image of 16:9 without any distortion or reduced distortion. In addition, the correction circuit adds only small number of circuits.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A circuit for sampling data, comprising:

a preprocessing correcting circuit that receives first least significant data deleted when a first pixel data is right-shifted for multiplying a filter coefficient by the first pixel data for down sampling and transmits a first resultant value to an adder used in the down sampling; and a filtering correcting circuit that logically combines the first least significant data and second least significant data deleted when a second pixel data is right-shifted in a filtering addition and transmits a second resultant value to the adder for the filtering addition, wherein the preprocessing correction circuit corrects a first round-off error generated during the multiplication.

2. The circuit of claim 1, wherein the first resultant value is input to the adder when correction is determined to be required.

3. The circuit of claim 1, wherein the filtering correction circuit corrects a second round-off error generated during the filtering addition, and wherein the second resultant value is input to the adder when correction is determined to be required.

4. The circuit of claim 1, wherein the preprocessing correcting circuit outputs a least significant bit deleted from the right-shifted first pixel data to a carry-in terminal of the adder as the first resultant value.

5. The circuit of claim 1, wherein the filtering correcting circuit comprises:

a first filtering correcting circuit that adds a first value in which a first pixel data is multiplied by 0.75 of a first filter coefficient and a second value in which a second pixel data is multiplied by 0.25 of the filter coefficient.

6. The circuit of claim 5, wherein the first filtering correcting circuit comprises:

a first logic-gate that logically processes a least significant bit of the first value in which the first pixel data is multiplied by 0.75 of the filter coefficient;

a second logic-gate that receives two least significant bits of the first value in which the first pixel data is multiplied by 0.75 of the filter coefficient;

a third logic-gate that receives two least significant bits of the second value in which the second pixel data is multiplied by 0.25 of the filter coefficient;

a fourth logic-gate that receives the least significant bit of the second value in which the second pixel data is multiplied by 0.25 of the filter coefficient;

a fifth logic-gate that receives the two least significant bits of the first value, a value outputted from the fourth logic-gate, and the second least significant bit of the second value; and a sixth logic-gate that receives values outputted from the second, third and fifth logic-gates and outputs the second resultant value.

7. The circuit of claim 6, wherein the first and fourth logic-gates are inverters, the second, third and fifth logic-gates are AND-gates and the sixth logic gate is an OR-gate, and wherein the second pixel data is lengthwise adjacent to the first pixel data.

8. The circuit of claim 1, wherein the filtering correcting circuit comprises a second filtering correcting circuit that adds the first value in which the first pixel data is multiplied by 0.5 of the filter coefficient and a second value in which the second pixel data is multiplied by 0.5 of the filter coefficient, and wherein the second filtering correcting circuit comprises a logic-gate that receives the least significant bit of the first value in which the first pixel data is multiplied by 0.5 of the filter coefficient and the least significant bit of the second value in which the second pixel data is multiplied by 0.5 of the filter coefficient and outputs the second resultant value.

9. The circuit of claim 1, wherein the circuit is a letter-box filtering circuit that down samples the pixel data from 16:9 to 4:3.

10. A method for sampling data, comprising:

preprocessing correcting a first error by outputting data that are deleted when multiplying a filter coefficient by a pixel data for a down sampling; and filter correcting a second error by logically combining the deleted data in performing a filtering addition for the down sampling, wherein the data are deleted by right-shifting the pixel data.

11. The method of claim 10, wherein the first error is round-off error, and wherein the preprocessing correcting corrects the round-off error when correction is required.

12. The method of claim 10, wherein the second error is round-off error.

13. The method of claim 10, wherein the deleted data are least significant digits of the pixel data.

14. The method of claim 10, wherein the pixel data are at least one of first and second pixel data, and wherein the filter coefficient is different for the first and second pixel data, respectively.

15. The method of claim 10, wherein the preprocessing correcting corrects the first error by adding a least significant bit deleted when bits of the pixel data are shifted to the right for the multiplying.

16. The method of claim 10, wherein the filtering correcting step corrects the second error by adding least significant bits deleted when bits of the pixel data are shifted to the right in the multiplying, wherein the filtering addition adds filtered pixel values determined by the multiplying to form filtered pixel data.

17. The method of claim 10, wherein the filtering correcting comprises:

a first filtering correcting for adding a first value in which a first pixel data is multiplied by 0.75 of a filter coefficient to a second value in which a second pixel data is multiplied by 0.25 of the filter coefficient.

18. A circuit for sampling data comprising:

first circuit means for outputting a first sampled data based on first and second pixel data and that corrects an error of the first sampled data using at least one bit of the first and second pixel data; and second circuit means for outputting a second sampled data based on the second pixel data and third pixel data and that corrects an error of the second sampled data using at least one bit of said second and third pixel data.

19. The circuit of claim 18, wherein said first circuit means and the second circuit means includes:

a preprocessing circuit having a plurality of first shifters to bit shift the first pixel data, and a first adder having inputs coupled to outputs of the shifters, said adder providing a first result corrected by a carry-in bit coupled to one of the bits of the shifters; and a first correction circuit having a second shifter to bit shift the second pixel data, a second adder having inputs coupled to receive the first result and output of the second shifter, and a first correction circuitry coupled to one of said plurality of first shifters and said second shifter for outputting a carry-in bit for the second adder to correct errors of the first sampled data.

20. The circuit of claim 18, wherein the circuit is a letter-box filtering circuit that down samples the pixel data from 16:9 to 4:3.

21. The circuit of claim 1, wherein the circuit for sampling data samples the pixel data from 16:9 to 4:3.

22. The method of claim 10, wherein the filtering correcting comprises:
   a second filtering correcting for adding a third value in which a third pixel data is multiplied by 0.5 of the filter coefficient to a fourth value in which a fourth pixel data is multiplied by 0.5 of the filter coefficient.

23. The circuit of claim 18, wherein the first and second circuit means comprise:
   first multiplier means for multiplying a first filter coefficient by first pixel data to output a third sampled data;
   second multiplier means for multiplying a second filter coefficient by the first pixel data to output a fourth sampled data;
   preprocessing means for logically combining first data deleted when the first and second pixel data are respectively right-shifted for multiplying the first and second filter coefficients by the first and second pixel data and transmitting a first resultant value;
   first adder means for adding the first resultant value, the third sampled data and the fourth sampled data to output the first sampled data;
   third multiplying means for multiplying a third filter coefficient by the third pixel data to output a fifth sampled data;
   filter correcting means for logically combining the first data deleted and second data deleted when the third pixel data is right-shifted in a filtering addition and transmitting a second resultant value; and
   second adder means for adding the second resultant value, the fifth sampled data and the first sampled data to output the second sampled data.

* * * * *